(No Model.)
J. C. De La VERGNE & J. J. SUCKERT.
Method of and Apparatus for Bottling and Barreling Malt and Fermented Liquids under Pressure.
No. 233,332.                    Patented Oct. 19, 1880.
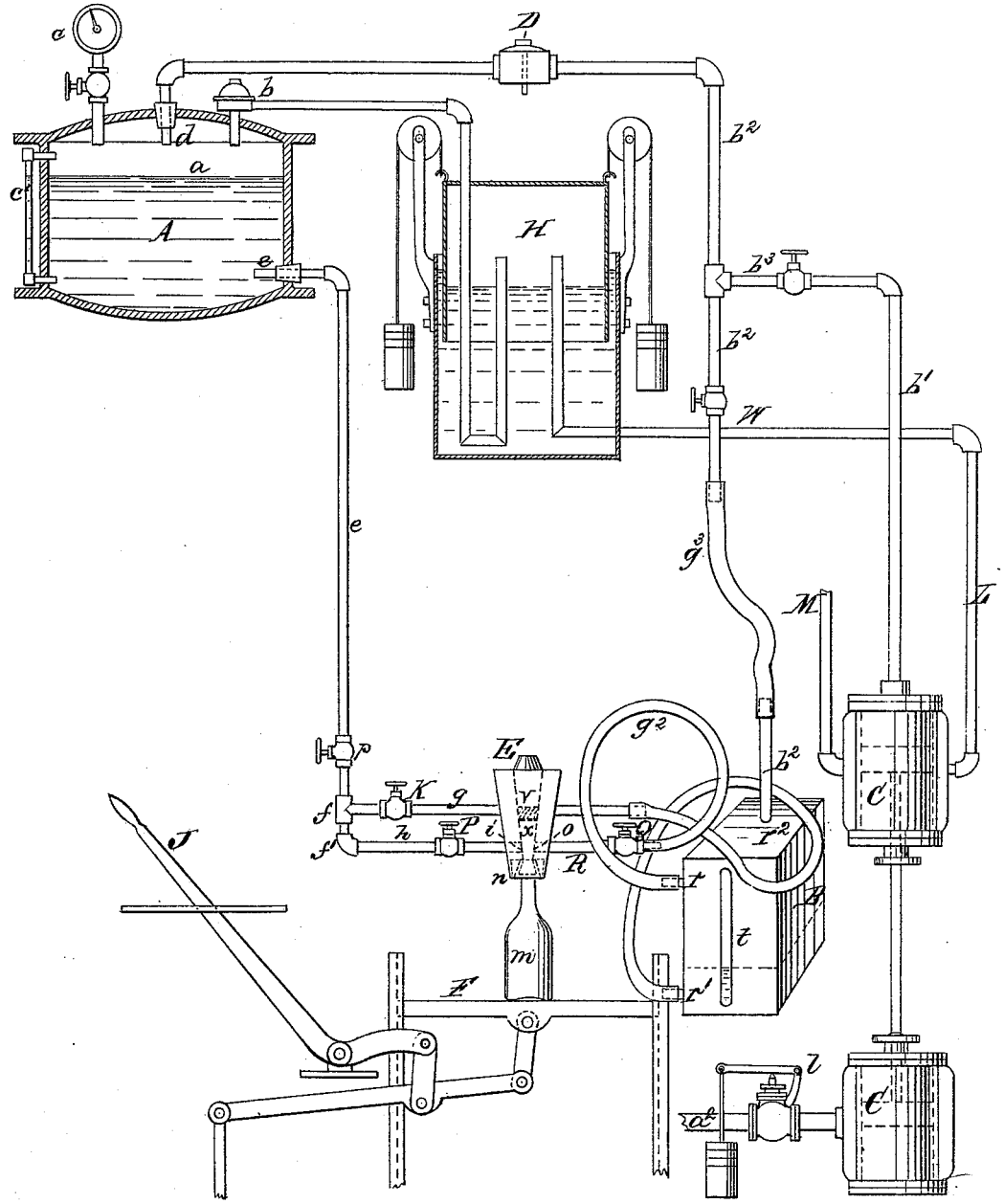
WITNESSES:
INVENTORS:
John C. De La Vergne
Julius J. Suckert
BY
Josiah H. Macy
ATTORNEY

UNITED STATES PATENT OFFICE.

JOHN C. DE LA VERGNE, OF NEW YORK, N. Y., AND JULIUS J. SUCKERT, OF JERSEY CITY, NEW JERSEY.

METHOD OF AND APPARATUS FOR BOTTLING AND BARRELING MALT AND FERMENTED LIQUIDS UNDER PRESSURE.

SPECIFICATION forming part of Letters Patent No. 233,332, dated October 19, 1880.

Application filed May 11, 1880. (No model.)

*To all whom it may concern:*

Be it known that we, JOHN C. DE LA VERGNE and JULIUS J. SUCKERT, citizens of the United States, residing, respectively, in the city, county, and State of New York, and at Jersey City, in the county of Hudson and State of New Jersey, have invented a new and useful Method of and Apparatus for Bottling and Barreling Malt and Fermented Liquids under Pressure; and we hereby declare that the following is a full, clear, and exact description of the invention, which will enable others skilled in the art to which it appertains to make and use the same.

The object of our invention is, first, to maintain within the vessel being filled an equable gaseous pressure before and after the insertion of the cork; secondly, to counteract the tendency of the liquid to foam as it flows from the discharge-pipe into the vessel being filled by a determined reactive pressure of air or gas, and to continue such pressure upon the surface of the liquid after the vessel is filled; thirdly, the prevention of an accumulation of foam, froth, or liquid in the gas-pipe connected with the filling-tube, which would retard, if not stop, the entire operation by receiving such overflow into the overflow and condensing tank, and saving the same, under gaseous pressure, for refilling without loss of liquid or gas.

The invention consists, first, in the method or process of maintaining within the vessel to be filled an equable gaseous pressure before and after the insertion of the cork, which is effected by first charging the liquid with the required pressure of carbonic-acid gas, then applying upon the surface of said liquid a constant and uniform pressure of air or gas in excess of that with which it is already charged, and then filling the liquid into the vessel under a determined pressure of air or gas; secondly, in the combination of the liquid tank or reservoir for holding the supply of charged liquid to be filled off, and having a suitable pressure-gage to indicate the pressure, an escape-valve to permit the escape of the excess of a required pressure within the tank holding the liquid inlet and outlet pipes for the passage of the gas and liquid, with a pump or other equivalent device for supplying a constant and uniform supply of air or gas upon the surface of the liquid in said tank and condensing-tank, and upon the surface of the liquid being filled into the vessel, one or more gasometers or receptacles to hold and furnish a supply of gas, a filling-tube for introducing the liquid, gas, and cork into the vessel to be filled, an overflow and condensing tank for receiving and condensing the froth or foam discharged from the filling-tube, and their intermediate connecting-pipes, with suitable shut-off cocks, to effect the process described; thirdly, in addition to the preceding combination, the addition of a reactive regulating pressure-valve, in combination therewith, to produce a greater pressure upon the surface of the liquid filled off or being filled off than is maintained in the liquid-reservoir, thus counteracting the tendency to foam; fourthly, in the combination of an overflow and condensing tank having suitable inlets and outlets for the passage of air, gas, or liquid, with the filling-tube, and their intermediate connecting-pipes, for the purpose of receiving and condensing the froth or foam overflowing from the filling-tube through the gas-pipe connected therewith, and holding the same under a gaseous pressure without loss of gas or liquid to be refilled; fifthly, in the combination of the sections of flexible tube $g^2$ and $g^3$ with the overflow and condensing tank B and pipes $b^2$ and R, which permit the tank B to be raised above the level of the fixed pipe $g$ to be emptied, and when emptied to be lowered below said level for the collection of the overflowing foam, froth, or liquid, all of which will be fully explained, reference being made to the accompanying drawing, wherein—

A is the air-tight reservoir or tank for holding the liquid to be barreled or bottled, having an indicator or pressure gage, $c$, and a liquid-gage, $c'$, to show the height of the liquid in the tank.

$b$ is an adjustable escape-valve, which can be set to permit the escape of air or gas at any desired pressure, and to which is attached a pipe to carry the discharged gas to a gasometer, from whence it is returned to the vacuum side of the pump, to be again used.

*a* represents the level of the liquid in the reservoir; *d*, a pipe through which the air or gas is forced upon the surface of the liquid in the reservoir, and which is connected by fittings with the overflow and condensing tank B and the pump C.

*b'* is the outlet-pipe from the pump, through which the air or gas passes to the reservoir A and overflow-tank B.

C is the air-pump, which, if required to run with variable speed and maintain approximately a given pressure, can be controlled by a regulating steam-valve, *l*, on the steam-pipe $a^2$, controlling its supply, or by any other well-known means.

M is the inlet-pipe of the pump, through which the main supply of air or gas is drawn.

B is an overflow and condensing tank connected with the pipe R and filling-tube E by means of a flexible tube, $g^2$. A similar flexible tube, $g^3$, is used to form the connection with the upper part of the pipe $b^2$. This tank is used for the reception of the overflow or foam (which is carried into the gas-pipe by accident or otherwise) from the liquid-supply pipe P, where it remains under pressure and returns to a liquid form. When it gathers in quantity it can be drawn off.

*t* is a liquid-gage, to show the height of the liquid in the tank B. *r* is the inlet through which the gas and foam pass. *r'* is the outlet for drawing the liquid collected in the tank B, which is accomplished by raising said tank till its bottom is on a level or above the pipe *g*, closing the valve *p* in pipe *e* and opening *k* in pipe *g* and the valves P and Q in pipes *h* and R. The liquid will then flow from the tank B, through the pipes *g* and *h*, under pressure, into the vessel placed to receive it.

$r^2$ is the inlet for the gas forced from the pump through the pipe $b^2$.

It will be seen that the pipes $b^2$ and *d* form the connection between the main reservoir A and the overflow and condensing tank B. At *r* connection is made between said tank B by the pipe R, valve and flexible tube $g^2$, and the filling and cork or bung tube E, and by pipes *h* and *e*, with the main tank or reservoir, thus establishing a complete circuit for the air or gas pressures. The pipe *g* is used only for the discharge of liquid from the tank B; but by means of it we are enabled to draw the liquid under pressure without waste or loss of gas.

E is the filling and cork or bung tube having an opening, *x*, through its center for the passage of corks or bungs, the said opening also having orifices, as at *i* and *o*, into the pipes *h* and R, one for the passage of the liquid and the other for the passage of gas into the tube *x*, and thence into the bottle or other vessel, which is pressed firmly by the vertically-moving table F, actuated by the lever J against the rubber cushion *n*. The openings in the tube and vessel are coincident, and the upper part of the tube *x* is closed by the insertion of a compressed cork or bung, *v*.

*e* is the pipe leading from the bottom part of the main tank or reservoir, through which the liquid flows, and is connected with filling-tube E by the pipe *h* and fittings *f* and *f'*.

It is evident that the pressure of the liquid as it enters the bottle or barrel must equal that of the gas plus the weight of the hydrostatic column; consequently the velocity with which the liquid flows will depend upon the height of this column. If the liquid should flow with too much rapidity, causing an accumulation of foam, another adjustable escape-valve, D, may be placed between the valve *b* and the pipe $b^3$, which can be set to blow off at a higher pressure than the valve *b*, thus increasing the pressure of air or gas in the tank B and pipe R over and above that in the reservoir A, and offsetting, wholly or in part, as desired, the weight of the liquid-column, and in this manner preventing an accumulation of foam caused by friction or otherwise.

Having designated the various parts of our apparatus, its mode of operation is as follows: Let all valves be closed except $b^3$, *w*, and *p*. A supply of liquid is first introduced in tank A, which is charged with the desired amount of carbonic-acid gas. A bottle or other vessel is placed upon the table F, so that the opening therein may coincide with that of the filling and cork tube E, and by means of the lever J it is forced up against the rubber cushion *n* sufficiently hard to prevent leakage and there secured. A cork or bung is then compressed and driven by a plunger part way into the tube E, as at *v*, preventing any escape of liquid or gas through the upper end of said tube. The pump is now started and runs continually during the operation of filling, controlled by a regulating steam-valve, *l*, on the steam-supply pipe $a^2$. If an equalized pressure is desired the valve D is thrown open, and the valve *b* set to permit the escape of gas in excess of a given pressure to the gasometer. The space above *a* in the tank A is then filled with compressed air or gas, and the circuit is established by opening the valve Q and admitting the compressed air, which compresses that in the bottle. The valve P is then opened to admit the liquid, which flows into the bottle, displacing the air or gas and driving it back into the pipe R and tank B, and sometimes overflowing and running into the said tank. The valve P is then closed, the air or gas pressure remaining upon the surface of the liquid in the bottle or other vessel to compress the foam and supply a pressure within when corked. The air is then turned off at Q and the cork or bung driven to its seat. The pump being continually in motion the circulation of air or gas is continuous, and with the aid of the regulating, escape, and pressure valves the pressure is constant and uniform without regard to the quantity of liquid drawn from the reservoir, the excess of pressure being returned through the valve *b* to the gas-reservoir H, and thence through the pipe L to the pump again.

Having described our invention, what we claim as new, and desire to secure by Letters Patent of the United States, is—

1. In bottling and barreling malt or fermented liquors under pressure, the method of maintaining within the vessel being filled an equable gaseous pressure before and after the insertion of the cork, which consists in first charging the liquid with the required pressure of carbonic-acid gas, then applying upon the surface of said liquid a constant and uniform pressure of air or gas in excess of that with which it has been already charged, and then filling the liquid into the vessel under a determined pressure of air or gas, substantially as herein set forth.

2. In an apparatus for filling, under pressure, malt or fermented liquids, the combination of the liquid-tank A, escape-valve $b$, filling-tube E, pump C, the overflow and condensing tank B, and their intermediate connecting-pipes, substantially as and for the purpose described.

3. In an apparatus for filling, under pressure, malt or fermented liquids, the combination of the liquid-tank A, escape-valve $b$, filling-tube E, pump C, overflow and condensing tank B, pressure-valve D, and their intermediate connecting-pipes, substantially as set forth.

4. In an apparatus for filling, under pressure, malt or fermented liquids, the combination of a pump, C, gas-receptacle H, tank A, escape-valve $b$, filling-tube E, overflow-tank B, and their intermediate connecting-pipes, substantially as set forth.

5. In an apparatus for filling, under pressure, malt or fermented liquids, the combination of a pump or generator, C, gas-receptacle H, escape-valves D and $b$, tank A, filling-tube E, tank B, and their intermediate connecting-pipes, substantially as described.

6. In an apparatus for filling malt or fermented liquids under pressure, the overflow and condensing tank B, in combination with the liquid-filling tube E, and their intermediate connecting-pipes, substantially as described.

7. In an apparatus for filling malt or fermented liquids under pressure, the combination, with the tank B, of the tank A, the liquid-filling tube E, the flexible tubes $g$, $g^2$, and $g^3$, and their intermediate connecting-pipes, substantially as described.

In testimony whereof we have hereunto set our hands and seals in the presence of two subscribing witnesses.

JOHN C. DE LA VERGNE. [L. S.]
JULIUS J. SUCKERT. [L. S.]

Witnesses:
WALTER W. MONTAGUE,
JOSIAH H. MACY.